United States Patent [19]

Shimomura

[11] 3,724,352
[45] Apr. 3, 1973

[54] SAFETY DEVICE FOR A CASSETTE AND ADAPTER ASSEMBLY FOR CAMERAS

[75] Inventor: Jun Shimomura, Tokyo, Japan

[73] Assignee: Nippon Kogaku K.K., Tokyo, Japan

[22] Filed: June 7, 1971

[21] Appl. No.: 150,631

[30] Foreign Application Priority Data

June 12, 1970 Japan ..................45/57522

[52] U.S. Cl. ...............................95/71, 95/1, 95/66
[51] Int. Cl. ...........................................G03b 17/26
[58] Field of Search..........................95/66, 71, 19

[56] References Cited

UNITED STATES PATENTS

| 484,569 | 10/1892 | Pierce | 95/71 |
| 1,613,378 | 1/1927 | Boniforti | 95/71 UX |
| 1,954,918 | 4/1934 | Burnell | 95/71 |
| 3,584,562 | 6/1971 | Wisner | 95/71 |
| 2,878,389 | 3/1959 | Raffman | 95/66 X |

*Primary Examiner*—John M. Horan
*Assistant Examiner*—Monroe H. Hayes
*Attorney*—Harry G. Shapiro

[57] ABSTRACT

A safety device in a cassette and adapter assembly for cameras which prevents the removal of the cassette from the adapter as well as the removal of the adapter from the camera body after a draw cover protecting the photosensitive material in the cassette is withdrawn from the cassette. The safety device prevents the cassette from being mounted in the adapter unless the draw cover of the cassette is in position. Additionally, the shutter button of the camera cannot be actuated when the cassette is installed unless the draw cover has been removed. The adapter can be mounted on the camera body when the cassette is not loaded in the adapter.

8 Claims, 7 Drawing Figures

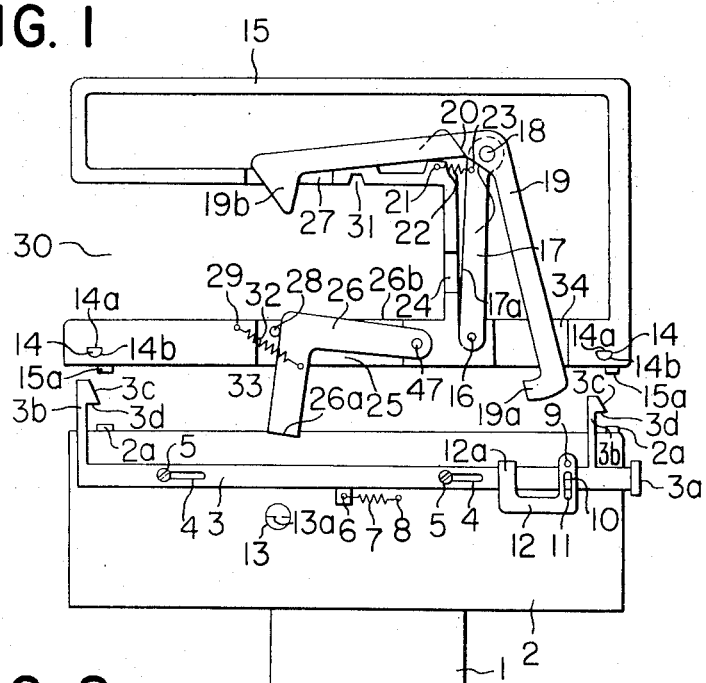
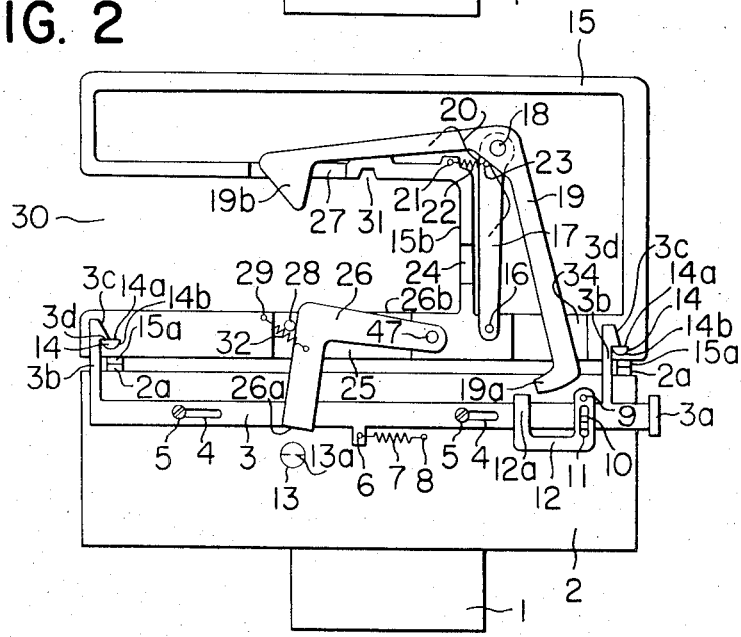

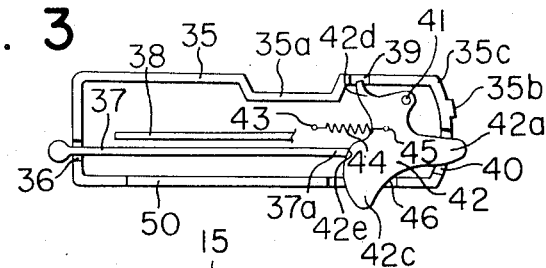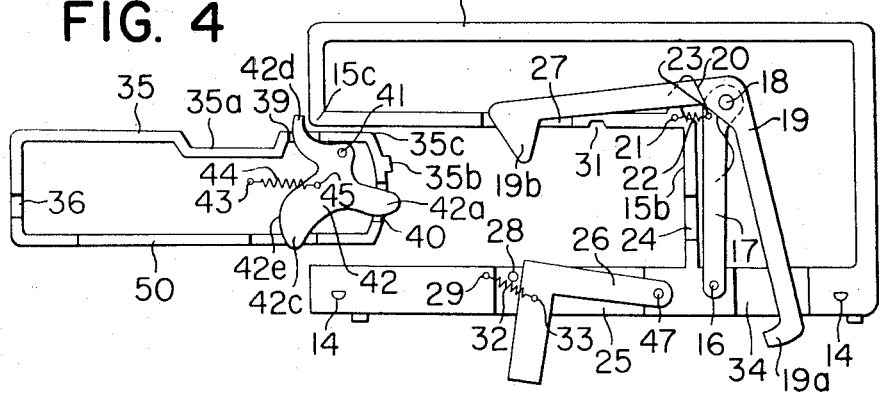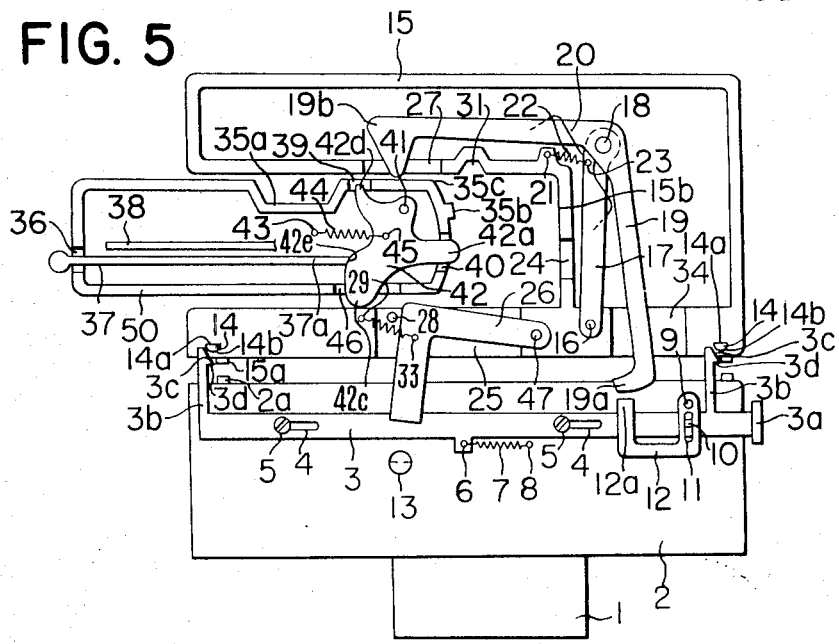

3,724,352

SAFETY DEVICE FOR A CASSETTE AND ADAPTER ASSEMBLY FOR CAMERAS

This invention relates to a cassette and adapter assembly used with cameras, and more particularly to a safety device in such cassette and adapter assembly.

BACKGROUND OF THE INVENTION

It is well known that loading cameras with a photosensitive medium can be readily and quickly accomplished by packing the photosensitive medium in a cassette and mounting or dismounting the cassette in the body of a camera. It is also known to provide film loading cassettes with a draw cover for opening and closing the exposure opening formed in the cassette. Furthermore, safety devices have been proposed which can prevent the cassette loaded with a photosensitive medium from being removed from the camera body unless the draw cover of the cassette is fully closed.

However, serious problems have been encountered when using cassette systems for loading and unloading different shapes or forms of photosensitive medium. While cassette systems ensure quick and ready loading and unloading or replacement of similarly formed photosensitive medium, such as rolls of monochromatic and color film, the cassette system is not always effective for replacing different forms of photosensitive medium such as sheet film and packed or roll film, because these different forms of photosensitive medium require differently shaped cassettes to hold them. In principle, of course, the advantages of the cassette system could always be obtained if all cassettes had the same size and construction for the portion of the cassette mounted to the camera body, regardless of the shape or form of the photosensitive medium to be contained in the cassette. However, forming every cassette in such a manner would, of necessity, be costly.

Because of these difficulties, it has also been proposed to standardize the mounting structure of cassettes, as for example, to that of the roll film cassette, and to use an adapter with such a mounting structure to accommodate any unusual form of cassette such as those cassettes containing sheet film, packed film and other films.

Such an adapter and cassette assembly should include a safety device which satisfies the following four requirements: (1) the cassette cannot be mounted to the adapter with the cassette draw cover open; (2) neither the cassette nor the adapter can be removed from the camera once the draw cover is withdrawn from the cassette; (3) the adapter can be freely mounted and dismounted to the camera body without the cassette being installed in the adapter; and (4) the shutter button of the camera should become inoperable when the draw cover of the cassette is closed.

None of the prior art devices have been able to satisfy the second and third of these requirements, while the other two conditions have been satisfied only in cassette systems which do not have an adapter.

SUMMARY OF THE INVENTION

The present invention seeks to provide a simple construction which satisfies all four of the requirements mentioned above.

To achieve this object, the present invention comprises a cassette for containing therein a photosensitive medium provided with a draw cover capable of opening and closing an exposure opening formed in the cassette. A signal member in the cassette indicates the fully closed position of the draw cover with respect to the exposure opening and transmits this signal to coacting members. An adapter which is constructed to be removably mounted to the body of a camera is provided for removably holding the cassette. The adapter includes a signal receiving member for receiving the signals representing the position of the draw cover in the cassette and a detection member which is connected to the signal receiving member and which detects whether the cassette has been completely mounted in the adapter. The detection member controls the mounting of the adapter to the camera body by interfering with a retainer member disposed in the camera body which retainer member detachably mounts the adapter to the camera body.

DESCRIPTION OF THE DRAWINGS

The above objects and features of the present invention will become more apparent from the following description taken in conjunction with the accompanying drawings, in which:

FIG. 1 is a plan view of an embodiment of the present invention showing a camera and a separate adapter without a cassette therein.

FIG. 2 shows the camera and the adapter of FIG. 1 in assembled position.

FIG. 3 is a plan view of a film cassette built in accordance with the teachings of the present invention.

FIG. 4 is a view similar to FIG. 1, but showing the adapter prior to installation of the cassette therein.

FIG. 5 is a view showing the camera, adapter and cassette just before the cassette has been fully inserted in the adapter.

DESCRIPTION OF THE PREFERRED EMBODIMENT

Figure 6:
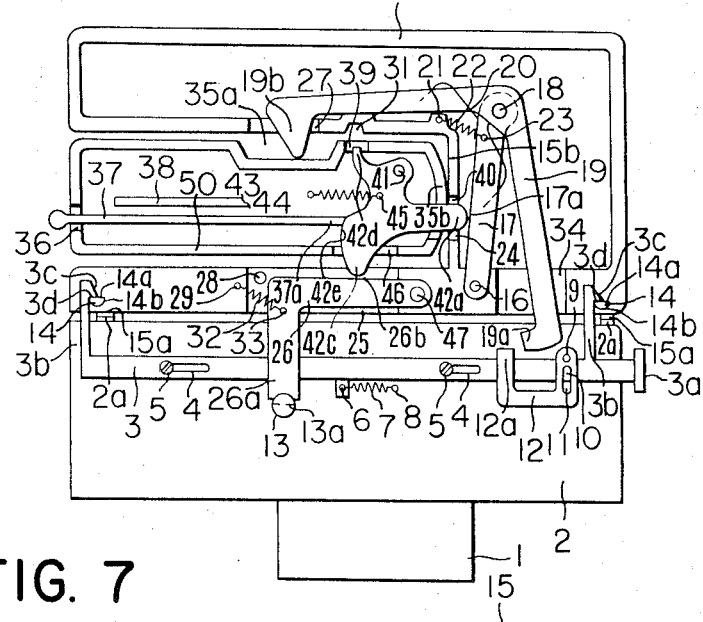
FIG. 6 is a view showing the camera, the adapter and the cassette in their completely assembled position.

Referring to FIG. 1, a camera body 2 having a lens 1 is provided with a retainer member 3 for detachably mounting an adapter 15 to the camera 2. The adapter 15 has a space 30 formed therein for containing a film cassette (see FIG. 3). The retainer member 3 has two retaining hook portions 3b formed at the opposite ends thereof, and is supported for movement to the right and left with respect to the camera body 2 by means of slots 4 formed therein and screws 5 passing through the slots. A pin 6 is studded in the retainer member 3 intermediately thereof, and a spring 7 is secured at one end thereof to the pin 6 and at the other end 8 to the camera body 2 to normally bias the retainer member 3 toward the right. The retainer member 3 also has a mount-dismount button 3a formed integrally therewith so that the retainer member 3 may be moved to the left against the force of the spring 7 when the button 3a is pushed to the left.

A mount-dismount blocking lever 12 is pivotally mounted on the camera body 2 by means of a shaft 9 and has a slot 11 formed therein for loosely receiving a pin 10 formed integrally with the retainer member 3.

Upon leftward movement of the mount-dismount button 3a the lever 12 will be rotated clockwise about the shaft 9 with the aid of the pin 10, so that one end 12a of the lever 12 will be displaced substantially forwardly with respect to the camera body toward adapter 15. A shutter button shaft 13, partly cut away axially as indicated at 13a, is provided in the camera body 2 and is depressed in the vertical direction with respect to the plane of the drawing to release the shutter.

The adapter 15 has two pins 14 of semicircular cross section studded therein at locations corresponding to the respective hook portions 3b of the retainer member 3. Each of these pins 14 includes a semicircular surface 14b confronting the camera and a flat surface 14a facing in the opposite direction. The adapter 15 also has two abutment means 15a formed therein for abutting with abutment means 2a of the camera body.

In the front wall of the adapter 15 is an opening 34 in which the lower end 19a of a detection lever 19 is movable. An opening 25 is also formed in the front wall of the adapter 15 through which a shutter button signal lever 26 extends, having an end 26a engageable with the cut-away 13a of the shutter button shaft 13. In one of the inner walls of the adapter 15 defining the space 30 for containing the cassette in the adapter, an opening 24 is formed adjacent to the side edge 17a of a signal receiving lever 17. In another inner wall defining the space 30, an opening 27 is formed through which the other end 19b of the detection lever 19 can project into the cassette containing space 30. Additionally, a notch 31 is formed on this same wall for retaining a first signal projection 42d forming a part of a cassette signal member 42, as shown in FIG. 3.

The signal receiving lever 17, which provides a signal receiving member, has one end thereof pivotally connected to the adapter 15 by means of a shaft 16 and the other end 18 pivotally connected to the detection lever 19, which constitutes a detection member. The signal receiving lever 17 is normally biased for counterclockwise rotation about the pivot shaft 16 by a tension spring 22, which has one end secured to the adapter 15 at a point 21 and the other end secured to a pin 23 studded in the signal receiving lever 17. Further, the signal receiving lever 17 and the detection lever 19 are biased with respect to each other by a spring 20 interposed between the two levers, so that the end 19a of the detection lever 19 tends to move away from the signal receiving lever 17.

The shutter button signal lever 26 is pivotally connected to the adapter 15 by means of a pin 47, and biased for counterclockwise rotation about that pin 47 by a spring 32, which has one end thereof secured to a pin 29 on the adapter 15 and the other end secured to a pin 33 on the shutter button signal lever 26. A stopper pin 28 for limiting the clockwise rotation of the lever 26 is studded in the adapter 15.

Referring now to FIG. 3, there is shown a cassette 35 enclosing a photosensitive medium 38. The cassette 35 is provided with a draw cover 37 for intercepting light between an exposure opening 50 formed in the cassette wall and the photosensitive medium 38. The draw cover 37 may be removably inserted into the cassette 35 through an aperture 36 in the cassette wall. When the draw cover 37 is inserted to fully close the exposure opening 50 of the cassette 35, the inner end 37a thereof forces the lobe portion 42e of cassette signal member 42 into the position shown in FIG. 3 as will be further described.

Cassette signal member 42 is pivotally connected to the cassette 35 by means of a pin 41 and biased for clockwise rotation about the pin 41 by a spring 44 extended from a pin 43 on the cassette 35 to a pin 45 on the cassette signal member 42. Cassette signal member 42 is formed with first, second and third signal projections 42d, 42a and 42c, which are adapted to be received in openings 39, 40, and 46 respectively, formed in the cassette wall. The cassette signal member 42 is constructed so that when the draw cover is fully closed the first signal projection 42d does not project out of the cassette 35 while the second and third signal projections 42a and 42c do project out of the cassette 35, as shown in FIG. 3.

The cassette 35 is further provided with a slightly recessed surface 35a for receiving the upper end 19b of the detection lever 19, and a slightly projected cassette positioning surface 35b. A corner portion 35c of the cassette 35 which is adjacent to the cassette positioning surface 35b is suitably rounded to reduce the shock imparted from that corner portion to the end 19b of the detection lever 19 when the cassette 35 is inserted into the adapter 15.

The operation of the present invention will now be described starting with the connection between the camera body 2 and the empty adapter 15, as shown in FIG. 1. The abutment means 2a of the camera body 2 and the corresponding abutment means 15a of the adapter 15 are brought into contact with each other to couple the camera 2 to the adapter 15, as shown in FIG. 2. During the coupling operation, the semicircular surfaces 14b of adapter pins 14 contact the sloped surfaces 3c of the hook portions 3b formed in the camera's retainer member 3 and urge the retainer member 3 to the left against the force of the spring 7 until the shoulders 3d of the hook portions 3b clear the flat surfaces 14a of the pins 14, whereupon the retainer member 3 is forced back to the right by the spring 7 into the position shown in FIG. 2. Thus, a connection is established between the camera body 2 and the adapter 15.

In the course of operation just described, the free end 12a of the lever 12 is moved forward toward adapter 15, and backwardly in response to the leftward and rightward movement of the retainer member 3. The forward and backward movement of the lever end 12a is never interfered with by the lower end 19a of the detection lever 19 because this end 19a assumes the position farthest to the right in the opening 34 of the adapter 15 when the adapter is not loaded with a cassette, as shown in FIGS. 1 and 2. As will be apparent from FIG. 2, with the empty adapter 15 coupled to camera 2, the shutter button shaft 13 can be freely depressed without the cut-away or engaging portion 13a thereof being reached by the end 26a of the shutter button signal lever 26.

In order to remove the empty adapter 15 from the camera body 2 in the position shown in FIG. 2, the mount-dismount button 3a may be pushed to the left to thereby release the engagement between the pins 14 of the adapter 15 and the retaining hook portions 3b of the retainer member 3. The leftward movement of the mount-dismount button 3a causes the end 12a of the mount-dismount blocking lever 12 to move toward adapter 15 but end 12a is not interfered with by the end 19a of the detection lever 19 because the latter end is positioned to the right, as shown in FIG. 2.

Therefore, as seen from FIGS. 1 and 2, the empty adapter 15 can freely be mounted and dismounted with respect to the camera without interfering with the free release of the camera shutter.

FIGS. 3 and 4 illustrate the manner in which the cassette 35 is inserted into the adapter 15. When the draw cover 37 is withdrawn from the position of FIG. 3, the cassette signal member 42 rotates clockwise to project the signal projection 42d out from the cassette opening 39, as shown in FIG. 4. In this position, the signal projection 42d is stopped by a corner 15c of the adapter at the entrance of the space 30 in the adapter 15, as shown in FIG. 4, thereby preventing the cassette 35 from being inserted into the adapter. Thus, the cassette with the draw cover 37 withdrawn or incompletely closed cannot be inserted into the adapter 15.

When the draw cover 37 is inserted into the cassette 35, as shown in FIG. 5, the signal projection 42d of the signal member 42 is retracted into the cassette 35, thereby allowing the cassette to be fully inserted into the adapter 15, as shown in FIG. 6.

When the cassette 35 is not completely fitted within the adapter, as shown in FIG. 5, the adapter cannot be mounted to the camera. With the cassette positioned as in FIG. 5, the upper end 19b of the detection lever 19 on the adapter 15 is displaced from the position shown in FIG. 4 by the rounded corner 35c of the cassette 35 and rotated clockwise about the pivot 18. As the result, the lower end 19a of the detection lever 19 is brought to the leftmost position in the opening 34 of the adapter 15 as shown in FIG. 5. When the adapter with an incompletely inserted cassette is brought into abutting relationship with the camera body, the simicircular surfaces 14b of the adapter's pins 14 try to strike the sloped surfaces 3c of the hook portions 3b to force the retainer member 3 leftwardly. As shown in FIG. 5, the free end 12a of the engagement blocking lever 12, which would move toward adapter 15 in response to the leftward movement of the retainer member 3, is prevented from moving toward the adapter 15 by the end 19a of the detection lever 19. Therefore, the retainer member 3 is not allowed to move to the left and, accordingly, the shoulders 3d of the hook portions 3b cannot engage the flat surfaces 14a of the simicircular sectioned pins 14.

The adapter 15 with the cassette 35 completely mounted within it, can be freely mounted and dismounted with respect to the camera. When the cassette 35 is inserted further into the adapter 15 from the position shown in FIG. 5 to the position shown in FIG. 6, the abutment projection 35b of the cassette 35 is in normal contact with the abutment surface 15b of the adapter 15. The second signal projection 42a of the cassette's signal member 42 is, therefore, brought into contact with the side edge 17a of the signal receiving lever 17 through the opening 24 in the adapter 15 and thereby causes the signal receiving member 17 to rotate clockwise about the pivot 16 against the force of the spring 22. With this rotation of the signal receiving member 17, the pivot 18 for supporting the detection lever 19 is displaced rightwardly. In FIG. 6, where the cassette 35 has been completely mounted in the adapter 15, the recessed surface 35a of the cassette 35 is opposed to the upper end 19b of the detection lever 19 so that the detection lever 19 is rotated clockwise by the force of the spring 20 until the end 19b of the lever 19 strikes the recessed surface 35a.

In response to the rotation of the end 19b and to the rightward displacement of the pivot 18, the lower end 19a of the detection lever 19 is moved to the right to again allow the free end 12a of the engagement blocking lever 12 to be moved toward the adapter 15, thereby permitting the mounting and dismounting of the adapter 15 with respect to the camera 2.

When the adapter 15 is mounted with respect to the camera, as shown in FIG. 6, the shutter button 13 cannot be depressed. The third signal projections 42c of the signal member 42 in the cassette 35 pushes the side edge 26b of the shutter button signal lever 26 to rotate this lever 26 counterclockwise about the pivot 47 against the force of the spring 32, so that the end 26a of the shutter button signal lever 26 engages the cut-away 13a of the shutter button shaft 13. Therefore, the shutter button 13 cannot be depressed.

Figure 7:
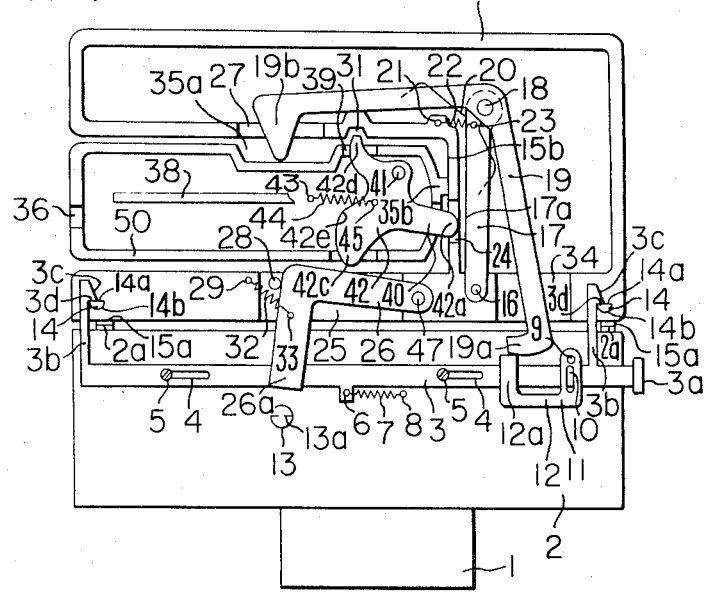
FIG. 7 is a view similar to FIG. 6, showing the assembly with the draw cover withdrawn from the cassette.

FIG. 7 shows the cassette 35 in the same position as FIG. 6, with the draw cover 37 withdrawn from the cassette 35. Once the draw cover 37 is withdrawn from cassette 35, the cassette cannot be removed from the adapter. When the inner end 37a of the draw cover 37 is moved away from the portion 42e of the signal member 42 of the cassette, the signal member 42 is rotated clockwise about the pivot 41 by the spring 44. This rotation of the signal member 42 causes the first projection 42d to project outwardly from the cassette 35 through the opening 39 and engage the mating notch 31 formed in the inner wall of the adapter 15, thereby preventing the cassette 35 from being withdrawn from the adapter 15. Furthermore, with the cassette 35 and adapter 15 positioned as shown in FIG. 7, once the draw cover 37 is withdrawn, the adapter cannot be removed from the camera body. With the aforesaid clockwise rotation of the signal member 42, the second signal projection 42a is displaced leftwardly and retracted within the opening 40 in cassette 35 so that the signal receiving lever 17 is rotated counterclockwise about the pivot 16 by the force of the spring 22, thereby displacing the pivot 18 of the detection lever 19 to the left. At the same time, the upper end 19b of the detection lever 19 is also displaced to the left while keeping in contact with the recessed surface 35a of the cassette 35 with the aid of the spring 20. Therefore, the lower end 19a of the detection lever 19 is displaced to the left in the opening 34 of the adapter 15 and is brought into the path of movement travelled by the free end 12a of the engagement blocking lever 12 to thereby prevent clockwise rotation of the lever 12, so that the mount-dismount button 3a cannot be pushed leftwardly to release the adapter 15.

Additionally, with the cassette 35 and adapter 15 positioned as shown in FIG. 7, the shutter button 13 is freed for actuation when the draw cover 37 is removed. As shown in FIG. 7, the third signal projection 42c of the signal member 42 is retracted into the cassette from the position of FIG. 6, so that the shutter signal lever 26 of the adapter is rotated clockwise about the pivot 47 by the force of the spring 32 to disengage the free end 26a thereof from the cutaway 13a of the shutter button shaft 13, thereby freeing shaft 13.

From the foregoing, it will be appreciated that the present invention can satisfy all four of the requirements previously discussed, including those requirements which could not be satisfied by the prior art. Moreover, the present invention satisfies these requirements with a simple construction using relatively few parts. Further, the cassette-adapter system set forth will allow simplified cassettes to be used in cassette systems which interchangeably provide different forms and shapes of photosensitive media.

It is believed that the advantages and improved results of the invention will be apparent from the foregoing description of a preferred embodiment of the invention. It will be apparent that various changes and modifications may be made without departing from the spirit and scope of the invention as sought to be defined in the following claims.

I claim:

1. A cassette and cassette adapter for mounting on a camera comprising, in combination, retaining means on the cassette adapter and the camera for coupling and uncoupling the cassette adapter to the camera, blocking means operatively associated with the retaining means to block operation of the retaining means, a wall forming the cassette having an exposure opening therein, a draw cover positioned with respect to the cassette to open and close the exposure opening of the cassette, means provided by the cassette adapter for positioning the cassette in the adapter, detection and signalling means connected to the cassette adapter responsive to the position of the draw cover with respect to the cassette and to the position of the cassette in the cassette adapter, the detection and signalling means operatively associated with the blocking means to prevent coupling and uncoupling of the cassette adapter from the camera when the exposure opening on the cassette is open and when the cassette is not properly positioned in the cassette adapter.

2. A cassette and cassette adapter for mounting on a camera according to claim 1, further comprising cassette signalling means in the cassette operative to actuate the detection and signalling means in response to the position of the draw cover, and the cassette signalling means coacting with the means for positioning the cassette in the cassette adapter to prevent the positioning and removal of the cassette in the adapter when the exposure opening of the cassette is open.

3. A cassette and cassette adapter for mounting on a camera according to claim 2, further comprising a shutter button on the camera, and shutter signalling means provided by the cassette adapter coacting with the cassette signalling means to prevent actuation of the shutter button when the cassette and the cassette adapter are mounted on the camera and the exposure opening in the cassette is closed.

4. A cassette and cassette adapter for mounting on a camera according to claim 2, wherein the cassette signalling means includes a plurality of projections, the cassette wall includes an opening corresponding to each projection, and further comprising means in the cassette to position each of the projections with respect to the corresponding opening in response to the position of the draw cover so that at least one projection will extend through the corresponding opening in the cassette wall and one projection will be withdrawn within the cassette when the exposure opening is open.

5. A cassette and cassette adapter for mounting on a camera according to claim 4 wherein the means provided by the cassette adapter for positioning the cassette includes a wall having a notch therein, and at least one of the projections of the cassette signalling means extends through the opening in the cassette wall when the exposure opening is open, so that the projection will engage the notch in the wall of the cassette adapter to prevent removal of the cassette from the cassette adapter and will interfere with the wall of the cassette adapter to prevent insertion of the cassette when the cassette exposure opening is open.

6. A cassette and cassette adapter for mounting on a camera according to claim 5 wherein the detection and signalling means comprise a detection lever adapted to coact with the blocking means and the cassette wall to prevent coupling of the cassette adapter to the camera when the cassette is not properly positioned in the cassette adapter.

7. A cassette and cassette adapter for mounting on a camera according to claim 6 wherein the detection and signalling means include a signal receiving lever which coacts with the projection of the cassette signalling means and with the detection lever to prevent coupling and uncoupling of the cassette adapter and the camera when the exposure opening in the cassette is open.

8. A cassette and cassette adapter for mounting on a camera according to claim 7 wherein the signal receiving lever is pivotally mounted on the cassette adapter and the detection lever is pivotally mounted to and responsive to the signal receiving lever.

* * * * *